Sept. 15, 1959  H. M. AUERBACH  2,904,436
PROCESS OF PREPARING A FLOATING FISH FOOD
Filed Nov. 17, 1958
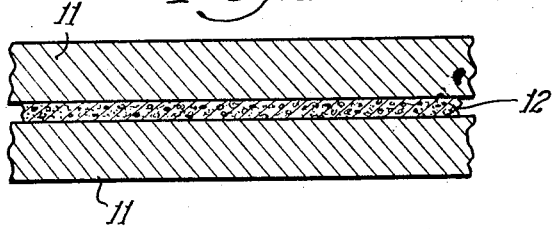
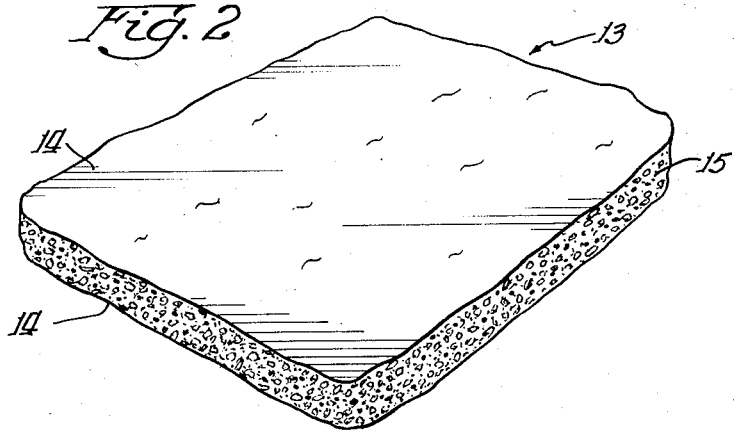
Inventor:
Herbert M. Auerbach
By: Jones, Darbo & Robertson
Attys.

United States Patent Office 2,904,436
Patented Sept. 15, 1959

2,904,436
PROCESS OF PREPARING A FLOATING FISH FOOD

Herbert M. Auerbach, Morton Grove, Ill.

Application November 17, 1958, Serial No. 774,280

5 Claims. (Cl. 99—3)

This invention relates to floating fish food and method of processing granular fish food ingredients, for use either for fish kept as a hobby, as in goldfish bowls and tropical fish aquariums or for supplying food to commercial fish ponds and the like.

Recently, it has been realized by fish fanciers and breeders that fish, like other living organisms, are benefitted by a varied diet, particularly one high in protein and vitamins, but heretofore it has been found difficult to artificially supply such food to fish in a form that will be readily available to the fish and will not collect in the receptacle when unconsumed by the fish to become stale or rancid and to pollute and contaminate the fish receptacle. Such contamination is especially detrimental to gold fish and tropical fish. The problem thus presented has been aggravated by the fact that the high nourishment food here referred to is granular in nature, thus having a relative high specific gravity that causes it to sink to the bottom of the receptacle.

An important object of the present invention is the working out of this problem by a method of processing such granular food ingredients by inhibiting the solubility of the granules and producing the floating fish food still containing the granular ingredients but having the capacity for floating on the surface of the water so that excess amounts unconsumed by the fish may be readily skimmed off and not remain in the tank.

The drawing illustrates a form of such food processed in accordance with the present invention and in the preferred form therefor, Figure 1 showing a step in the method and Figure 2 an enlarged perspective view of the product.

In carrying out the present invention suitable proportions of a number of appropriate high nourishment food ingredients may be selected, examples of which various selections may be as follows:

Example I

| | |
|---|---|
| Meat meal | Daphnia |
| Shrimp meal | Wheat germ meal |
| Corn meal | Bone charcoal |
| Bran | Corn germ meal |
| Alfalfa meal | Salt |
| Dried flies | Dried vegetables |

Example II

| | |
|---|---|
| Meat meal | Skim milk powder |
| Liver meal | Tomato pulp |
| Fish meal | Alfalfa meal |
| Shrimp meal | Dried eggs |
| Soy bean oil meal | Mosquito larvae |

Example III

| | |
|---|---|
| Liver meal | Corn flakes |
| Fish meal | Kelp |
| Crab meal | Wheat germ meal |
| Wheat standard middlings | Bone charcoal |
| Oat meal | Salmon eggs (dried) |
| Dried yeast | Dried fruits |
| Bone meal | |

The foregoing represent food selections having a high nourishment value. Some of each item in an illustrative group as given above are desirably included in a selected combination. Various other combinations or sub-combinations of the foregoing may be used.

Desirably, the mixed ingredients are first ground so as to reduce the coarse ones to a finer consistency and to produce a fairly uniform consistency for the combined ingredients mixture.

For processing the ingredients in accordance with the present invention, I take three parts by weight of the combined selected ingredients as above suggested, or any desired combination thereof, and add thereto one part of pre-gelatinized wheat starch. To this I add approximately one gallon of water for say an equivalent volume of the ingredients plus the wheat starch. To the ingredients and wheat starch, I add four to six parts by weight of low fluidity or thick-boiling corn starch, adding sufficient water to bring the density of the resulting mixture to approximately 1.120 specific gravity at approximately 60° F. The foregoing will produce a rather thick slurry.

The pre-gelatinized wheat starch is a binding agent that combines the various ingredients for the purposes of the later steps of the process. While the amount of the corn starch added is approximately equal to the combined weight of the ingredients and wheat starch, as much as thirty percent more corn starch can be added. More than that would not be desirable.

Sufficient water may be added if necessary to the combined ingredients, wheat starch, corn starch and previous water to maintain the specific gravity of the resulting mixture at say 1.120 at 60° F. The density may be increased to 1.135 but beyond that the finished product will not readily float for any length of time. The density may be decreased to 1.110 but a density lower than that will produce such a thin product that it will tend to dissolve and not float in water. Densities of less than 1.05 and greater than 1.40 specific gravity would be undesirable.

From the mixture just described, a suitable quantity at a time is taken and placed between two hinged heated platens, similar in principle to a waffle iron, these platens being first heated to between 270° F. and 290° F. Thereby a cellular structure is formed in the heated slurry by quick expansion of the steam therein, generated when the upper and lower platen plates are closed on the mix.

A heat much greater than that indicated will create too large a cell while too low a heat will produce such a small cell that the density of the product will be such that it will not float very long.

Furthermore, if the platens are heated substantially below 260° F. the slurry will dry too slowly and hence a poor cell structure be formed while if the platens are heated substantially above 300° F. the product will tend to be scorched and the cell structure would also be too large.

The mix is heated as described for a sufficient time to dry the food to a moisture content of approximately four or five percent. If the food is removed before sufficient drying the formation of the desirable cell structure is impaired. On removal from the platens the sheeted food may be cut into convenient smaller sheets or broken to suitable sized small flakes that avoid particles too small to maintain buoyancy.

The space between the platens should desirably be between .020 and .045 of an inch. If the distance between the platens is less than that there is insufficient room for an adequate cell structure to be formed while if the opening is substantially greater, then the cell structure is too large and the drying action is impaired or delayed.

If the proportion of pre-gelatinized wheat starch is substantially greater than that indicated, the finished product will be too light, while if substantially more of the thick-boiling corn starch be used, the density will be undesirably increased. Furthermore, the pre-gelatinized starch should have sufficient thickening capacity so as not to require too much of this starch, since an excess quantity would decrease the protein content of the product to the extent that it would no longer be a good fish food.

While other binders than pre-gelatinized wheat starch may be used, such as pre-gelatinized corn starch, a higher proportion of starches other than pre-gelatinized wheat starch would be required to provide an adequate binder, which would be undesirable by reducing the protein content. Wheat starch is particularly suitable for the purpose because of its adhesive characteristics, thus serving as a good binder.

In Fig. 1 of the drawings, the platens are indicated by the numeral 11, the slurry therebetween by the numeral 12. Fig. 2 shows a fragment of the finished food product 13, having the skin-like surfaces 14 and a granular-cellular interior 15. Both views and particularly the fragment 13 are enlarged and greatly exaggerated in cross-section.

The product resulting from the practice of the present invention consists of a sheet of fish food having a high protein content, the sheet having the outer skins or faces 14 less frangible than the interior of the sheet, which thus hold the sheet together, and, in spite of its relatively high protein content, causes the sheet to float on the surface of the water of the aquarium or the like, the cellular structure 15 between the surfaces skins giving the sheet a desired buoyancy so that excess amount of food placed in the tank and unconsumed by the fish may be scooped off at suitable intervals to be replaced by a fresh supply. The composite sheet is sufficiently softened by the water of the tank so that the fish may nibble thereat and readily be fed thereby, while at the same time even though water is absorbed the cell structure is such as to trap sufficient air to remain buoyant, and the structure of the product is such as to prevent the dissolving of the food in the water, thus avoiding contamination of the water.

The invention having been described, it is to be understood that such changes may be made as fall within the scope of the appended claims without departing from the invention.

What is here claimed is:

1. The process of preparing a high nourishment fish food in a form capable of floating on water, which is characterized by the steps of: selecting a variety of edible ingredients including certain of high protein content, grinding said ingredients to reduce them to and mix them in granular form, mixing three parts by weight of said mixed ingredients with one part by weight of pre-gelatinized wheat starch, adding sufficient water to form a thick slurry, adding to said slurry an amount of low-fluidity corn starch at least equal to the combined weight of the ingredients and wheat starch, placing a quantity of the resulting mixture between a pair of hot platens heated to a temperature of from 260 degrees F. to 300 degrees F., whereby to form a sheet having skin-like surfaces and a heat expanded intermediate layer, and breaking the sheet into flakes 2. The process of claim 1 wherein sufficient water is added to bring the specific gravity of the final mixture to 1.120.

3. The process of claim 1 wherein sufficient water is added to bring the specific gravity of the final mixture to between 1.050 and 1.35 at 60 degrees F.

4. The process of claim 1 wherein the distance apart of the platens is between .020 and .045 of an inch.

5. The process of claim 1 wherein the temperature of the platens is between 270° F. and 290° F.

References Cited in the file of this patent

UNITED STATES PATENTS

| | | |
|---|---|---|
| 871,486 | Debroisse | Nov. 19, 1907 |
| 2,358,320 | Eisaman | Sept. 19, 1944 |